United States Patent

Suzuki et al.

Patent Number: 6,044,383
Date of Patent: Mar. 28, 2000

[54] TABULATION DEVICE

[75] Inventors: Akira Suzuki; Kenichi Kobayashi, both of Nakai-machi, Japan

[73] Assignee: Fuji Xerox Co., Ltd., Tokyo, Japan

[21] Appl. No.: 08/909,851

[22] Filed: Aug. 12, 1997

[30] Foreign Application Priority Data

Aug. 13, 1996 [JP] Japan .................................. 8-213446

[51] Int. Cl.[7] ...................................................... G06F 3/14
[52] U.S. Cl. .......................................... 707/509; 707/504
[58] Field of Search .................................. 707/509, 503, 707/504

[56] References Cited

U.S. PATENT DOCUMENTS

| | | | |
|---|---|---|---|
| 5,808,914 | 9/1998 | Shin et al. | 364/578 |
| 5,835,916 | 11/1998 | Inaki et al. | 707/509 |
| 5,835,917 | 11/1998 | Shin et al. | 707/509 |
| 5,881,381 | 3/1999 | Yamashita et al. | 707/509 |

FOREIGN PATENT DOCUMENTS 3-38774   2/1991   Japan .
7-334490  12/1995  Japan .

*Primary Examiner*—Stephen S. Hong
*Assistant Examiner*—Cesar B. Paula
*Attorney, Agent, or Firm*—Oliff & Berridge, PLC

[57] ABSTRACT

The present invention provides a tabulation device which may both automatically determine the line spacing of grid structure of a table and automatically line breaking text string in a cell, with less computing costs. In this device for retaining grid structure retains the relationship of the relative position of cells in a table and the text strings to be laid out to each cell. Text field size threshold retains, with respect to each text string, discontinuous points in the line-breaking function as the threshold value of the size of text field. Table layout selects one of the corresponding threshold values from within the text field size threshold for the text string to be laid out, and storing in text field size retaining unit as the size of text field to perform the layout. Layout evaluating evaluates the allocation results of the table from the size of text field in the text field size retaining unit and directs table allocating to reallocate if requirements are not satisfied.

12 Claims, 15 Drawing Sheets

|  | d |
|---|---|
| d1 | |

| THESE SENTENCES ARE FOR THE EXPLANATION AND DO NOT HAVE ANY SIGNIFICANT MEANING | THIS IS A SOMEWHAT LONG SENTENCE |
| SHORT SENTENCE | IT IS POSSIBLE THAT A LONG SENTENCE AND A SHORT SENTENCE APPEAR IN THE TABLE |

FIG.3

| THESE SENTENCES ARE FOR THE EXPLANATION AND DO NOT HAVE ANY SIGNIFICANT MEANING | THIS IS A SOMEWHAT LONG SENTENCE |
| SHORT SENTENCE | IT IS POSSIBLE THAT A LONG SENTENCE AND A SHORT SENTENCE APPEAR IN THE TABLE |

FIG.4

| TEXT NO. | TEXT FIELD SITE THRESHOLD | | | | |
|---|---|---|---|---|---|
| 1 | (w=1, h=3) | (w=2, h=2) | (w=3, h=1) | | |
| 2 | (w=1, h=4) | (w=2, h=2) | (w=4, h=1) | | |
| 3 | (w=1, h=8) | (w=2, h=4) | (w=3, h=3) | (w=5, h=2) | (w=9, h=1) |
| 4 | (w=1, h=8) | (w=2, h=4) | (w=3, h=3) | (w=4, h=2) | (w=8, h=1) |
| 5 | (w=1, h=5) | (w=2, h=3) | (w=3, h=2) | (w=5, h=1) | |
| 6 | (w=1, h=5) | (w=2, h=3) | (w=3, h=2) | (w=5, h=1) | |
| 7 | (w=1, h=8) | (w=2, h=4) | (w=3, h=3) | (w=4, h=2) | (w=8, h=1) |
| 8 | (w=1, h=7) | (w=2, h=4) | (w=3, h=3) | (w=4, h=2) | (w=7, h=1) |
| 9 | (w=1, h=6) | (w=2, h=3) | (w=3, h=2) | (w=6, h=1) | |

| TEXT NO. | TEXT FIELD SIZE |
|---|---|
| 1 | (w=3, h=1) |
| 2 | (w=4, h=1) |
| 3 | (w=5, h=2) |
| 4 | (w=8, h=1) |
| 5 | (w=5, h=1) |
| 6 | (w=5, h=1) |
| 7 | (w=8, h=1) |
| 8 | (w=7, h=1) |
| 9 | (w=6, h=1) |

FIG. 11

| TEXT NO. | TEXT FIELD SIZE |
|---|---|
| 1 | (w=3, h=1) |
| 2 | (w=4, h=1) |
| 3 | (w=5, h=2) |
| 4 | (w=4, h=2) |
| 5 | (w=5, h=1) |
| 6 | (w=5, h=1) |
| 7 | (w=4, h=2) |
| 8 | (w=4, h=2) |
| 9 | (w=6, h=1) |

FIG. 12

| 3 CHARACTERS | 4 CHARACTERS | 9 CHARACTERS |
|---|---|---|
| 8 CHARACTERS | 5 CHARACTERS | 5 CHARACTERS |
| 8 CHARACTERS | 7 CHARACTERS | 6 CHARACTERS |

FIG. 13

| TEXT NO. | TEXT FIELD SIZE |
|---|---|
| 1 | (w=3, h=1) |
| 2 | (w=4, h=1) |
| 3 | (w=5, h=2) |
| | |
| | |
| | |
| | |
| | |
| | |

| TEXT NO. | TEXT FIELD SIZE |
|---|---|
| 1 | (w=3, h=1) |
| 2 | (w=4, h=1) |
| 3 | (w=5, h=2) |
| 4 | (w=4, h=2) |
| 5 | (w=5, h=1) |
| 6 | (w=5, h=1) |
| | |
| | |
| | |

| TEXT NO. | TEXT FIELD SIZE |
|---|---|
| 1 | (w=3, h=1) |
| 2 | (w=4, h=1) |
| 3 | (w=5, h=2) |
| | |
| | |
| | |
| | |
| | |
| | |

FIG. 18A

| COL1 | COL2 | COL3 |
|---|---|---|
| 4.5 | 6 | 7.5 |

FIG. 18B

| TEXT NO. | TEXT FIELD SIZE |
|---|---|
| 1 | (w=3, h=1) |
| 2 | (w=4, h=1) |
| 3 | (w=5, h=2) |
| 4 | (w=4, h=2) |
| 5 | (w=5, h=1) |
| 6 | (w=5, h=1) |
| | |
| | |
| | |

FIG. 18C

| TEXT NO. | TEXT FIELD SIZE |
|---|---|
| 1 | (w=2, h=2) |
| 2 | (w=2, h=2) |
| 3 | (w=5, h=2) |
| | |
| | |
| | |
| | |
| | |
| | |

FIG. 20A

| TEXT NO. | TEXT FIELD SIZE |
|---|---|
| 1 | (w=2, h=2) |
| 2 | (w=2, h=2) |
| 3 | (w=5, h=2) |
| 4 | (w=4, h=2) |
| 5 | (w=3, h=2) |
| 6 | (w=3, h=2) |
| | |
| | |
| | |

FIG. 20B

| TEXT NO. | TEXT FIELD SIZE |
|---|---|
| 1 | (w=2, h=2) |
| 2 | (w=2, h=2) |
| 3 | (w=5, h=2) |
| 4 | (w=4, h=2) |
| 5 | (w=3, h=2) |
| 6 | (w=3, h=2) |
| 7 | (w=4, h=2) |
| 8 | (w=4, h=2) |
| 9 | (w=3, h=2) |

FIG. 20C

| 3 CHARACTERS | 4 CHARACTERS | 9 CHARACTERS |
|---|---|---|
| 8 CHARACTERS | 5 CHARACTERS | 5 CHARACTERS |
| 8 CHARACTERS | 7 CHARACTERS | 6 CHARACTERS |

FIG. 21

| COL. NO. | COLUMN SIZE THRESHOLD |
|---|---|
| 1 | w=1, w=2, w=3, w=4, w=8 |
| 2 | w=1, w=2, w=3, w=4, w=5, w=7 |
| 3 | w=1, w=2, w=3, w=5, w=6, w=9 |

| COL. NO. | COLUMN SIZE |
|---|---|
| 1 | w=8 |
| 2 | w=7 |
| 3 | w=9 |

| COLUMN NO. | COLUMN SIZE |
|---|---|
| 1 | w=8 |
| 2 | w=7 |
| 3 | w=6 |

| COLUMN NO. | COLUMN SIZE |
|---|---|
| 1 | w=4 |
| 2 | w=7 |
| 3 | w=6 |

| COLUMN NO. | COLUMN SIZE |
|---|---|
| 1 | w=4 |
| 2 | w=5 |
| 3 | w=6 |

| 3 CHARACTERS | 4 CHARACTERS | 9 CHARACTERS |
|---|---|---|
| 8 CHARACTERS | 5 CHARACTERS | 5 CHARACTERS |
| 8 CHARACTERS | 7 CHARACTERS | 6 CHARACTERS |

FIG. 27

TABULATION DEVICE

BACKGROUND OF THE INVENTION

1. Field of the Invention

The present invention relates to a tabulation device which, when performing tabulation based on given information, automatically assigns the information into a table.

2. Description of the Prior Art

In recent days in a document processing system, tabulation function has been become indispensable. In a prior simple system, a user draws ruled lines to arrange text into each cell of the partitioned table. In such a system, if either the text overflows the cell or there is too much blank space, the user should redraw the ruled lines to rearrange the form of the table. The user is forced to perform trial and error and to spend wasted time.

In order to make a table, one has to determine the height of each row and the width of each column of the table to fill the cells with text by line-breaking in accordance with either the column width for side-by-side writing or with the row height for up-to-down writing. The height of rows and the width of columns of the table will be determined by a variety of conditions such as text to be lay out, and the size of the entire table.

In the methods of tabulation in the prior art, these conditions are adjusted and determined by a user such that the success of making a table depends on the ability of the user, therefore a user might not be able to achieve a table, or might spend enough labor. Thus a system which may automatically determine the height of the row and the width of the column in a table will have significant merits for any user.

Even though the merit is clear, commonly used systems does not provide a function for achieving both automatic adjustment of the height of rows and the width of columns of a table and automatic line-breaking. The reason is based on the technical problems as described below.

The coexistence of automatic adjustment of the vertical intervals (height of rows) and automatic line-breaking, when the horizontal intervals (width of column) is predefined, has been already implemented. In such system as J-Star (registered trade mark), LaTeX, and Interleaf5 (trade mark), this function is achieved by the method as describedbelow. At first, line-breaking of the text is calculated by filling a cell with text string so as to fit the string into the predefined cell width (sum of the width of rows to which the cell intersects). Based on the calculated line-breaking, the height of the text string is determined. Then, the minimum vertical interval is calculated so as for the height of the cell to be larger than the height of the fulfilling text string. In such a manner, the determination of the vertical interval and the line-breaking of the text string may be automatically performed in the case in which the horizontal interval is predefined.

On the other hand, it is not easy to automatically determine the column width, the row height, and the line-breaking of fulfilling text string in comparison with the case, as described above, in which the column width is predefined. FIGS. 2, 3 and 4 are schematic diagrams illustrating an exemplary table. The table shown in FIGS. 2 to 4 is a simple table which contains four cells. d1 and d2 designate the widths of the first and the second columns, respectively, and it is assumed that any value may be taken under the condition of d1+d2=(d), where d is a constant determined from the page width or so.

As mentioned above, once the column width is defined, the height of row and the line-breaking of the text string may be automatically determined. However, it is to be noted that there are infinite ways of how to define the column width. For example, it is possible to have d1=0.5d as shown in FIG. 2, or it also is possible to have d1=0.2d as shown in FIG. 3, or it is possible further to have d1=0.8d as shown in FIG. 4. Therefore in order to determine the column width, some conditions should be predefined so as to be able to select ones which may satisfy the conditions among infinite ways of determining the column width.

However, even if a condition, such as "shrink area as small as possible" is defined, there arises a problem here how to find the best way to determine the column width satisfying the condition.

There has been disclosed means for solving this problem in Japanese Published Unexamined Patent Application No. Hei 3-38774 and No. Hei 7-334490. Here the method described in the Japanese Published Unexamined Application No. Hei 3-38774 will be explained first. In this patent, when a user alters the size of a cell, the height of the row which includes the cell will be assumed to be the height of the cell, and the width of the column will be assumed to be the width of the cell. Once defined the height of the row, for each cell contained in the row, the minimumwidth for text string in the cell will be determined and this width is made to be the width of each cell. In a similar way, the height of the cell within the column will be determined from the column width. This allows the height/width of total row/column in the table to be determined. If there is a cell overflowing the text string, the size of the cell will be adjusted so as to contain the string.

The method described in the Japanese Published Unexamined Patent Application No. Hei 3-38774 requires for the cell size of reference to be given at first, thus there is a problem that the row height, column width, and line-breaking may not be calculated in a fully automatic manner. In addition, for determining the width of an other cell within the same row to the reference cell, the cell width just fitting to the text string is sought by increasing or decreasing the cell width by the size of one character. This method cannot be applied to the case in which the size of characters varies in the text string. Furthermore, it poses problems that it takes a number of steps to achieve to a desired cell width because the cell width is altered one by one in a step even when the cell width is to be significantly altered.

Next, the method disclosed in the Japanese Published Unexamined Patent Application No. Hei 7-334490 will be described. Its line-breaking function will be described first. Here it is assumed that text "T" is fixed and then it is considered how to fit text "T" into a rectangular area. The line breaking function "f" of the text "T" is a function which maps a width "W" of a rectangular area to the minimum height "H" of the area required for laying out the text "T". It should be noted that the definition range of the function "f" is $0 \leq H$, and a special value "$\perp$" is returned for the unallocatable "H".

FIG. 5 shows an example of the line-breaking function. In this figure, there is shown the line-breaking function for the text string of fixed pitch, uniform character size, and the length of text string "9". As shown in FIG. 5, the line-breaking function is a step function. That is, for width "W" of the rectangular area to be laid out with the string, there are values $W_i$ and $W_{i+1}$, and the height of the rectangular area will not be altered in the range $W_i \leq W < W_{i+1}$. Then the width of the rectangular area becomes smaller than a predetermined width, line-breaking will be occurred to increase the height of the rectangular area. Also, the height of the rectangular area will be constant until the width becomes smaller than another predetermined value since the amount of blank space within the text string is adjusted.

In this example the character size in the text string is uniform. Although the line-breaking function is the step function as shown in FIG. 5 even when the character size is not constant, it is not always limited to a decreasing function. In the following description, a line-breaking function which returns height for the width of the rectangular area is used by way of example, a line-breaking function returning width for the height also may be used instead.

The tabulation device according to Japanese Published Unexamined Patent Application No. Hei 7-334490 classifies the cases based on which the step height of step function corresponds to each text string. Then if the width of each column of the table is a parameter, since the text height is made uniform in each respective case and thus, the area of each cell may be expressed in a linear equation of these parameters. This means that the area of the table (=sum of the area of each cell) may also be expressed in a linear equation of these parameters. By using this, the way how to select parameters so as to minimize the area of the table, in other words, the way how to select column widths so as to minimize the area of the table in that case, may be determined by the linear programming method. In each classified case as above, the way to select column widths so as to minimize the table area will be respectively determined and thereafter, by comparing them, the best way to select column width so as to minimize the table area among them will be adopted.

The method disclosed in the Japanese Published Unexamined Patent Application No. Hei 7-334490 allows the way to select column width strictly minimizing the area of the table. Moreover, it allows users to specify arbitrary linear equations of the parameters (column widths), such that for example, a limitation such as "the width of table is to be less than or equal to 50 mm" may be arbitrarily set. However, in the case that the text string becomes long so that the number of steps of the line-breaking function increases, or in the case that the number of the text string in the table increases, the number of classified branch may become in the order of thousands or tenth of thousands and, in addition, a linear programming method which has high computing costs has to be solved for each case. This results in that this method has the problem of very high costs for tabulation.

SUMMARY OF THE INVENTION

The present invention is contrived in view of the aforementioned situation in order to provide a tabulation device which may both automatically determine the line spacing of grid structure of a table and automatically line-break text string in a cell, with less computing costs.

Accordingly, it is an object of the present invention to provide an improved tabulation device comprising:

a grid structure retaining means which maintains text strings composing a table and grid structure;

text field size threshold providing means for providing at least a value of one of the width and the height at a plurality of discontinuous points output of a line-breaking function on said text strings composing a table, said line breaking function of a text maps a width/height to a height/width of a rectangular area whose height/width is minimum for laying out the text in said rectangular area;

text field size retaining means for retaining a relationship between said text string composing said table and the size of a rectangular area provided by said text field size threshold providing means in response to said text;

table layout means for acquiring one of said sizes of rectangular area from said text field size threshold providing means, for causing said text field size threshold retaining means to retain the relationship between said text and said one of the sizes of rectangular area acquired by said table lay out means, based on said grid structure; and evaluating means responsive to the result of comparison of the tabulation by said table lay out means with predetermined conditions for directing said table layout means to acquire another one of the sizes of rectangular area from said text field size threshold providing means, for causing said text field size threshold retaining means to retain the relationship between said another one of the sizes of rectangular area and said text.

BRIEF DESCRIPTION OF THE DRAWINGS

The present invention will be best understood by reading the following description of the preferred embodiments thereof, with reference to the accompanying drawings, in which:

FIG. 3 is a schematic diagram of one exemplary table;

FIG. 4 is a schematic diagram of one exemplary table;

FIG. 6 is a schematic diagram of one example of grid structure information retained in the grid structure retaining unit 1 of the first preferred embodiment of the tabulation device according to the present invention;

FIG. 11 is a schematic diagram showing one example of the size of text field retained in the text field size retaining unit during the practical process in one exemplary operation of the first preferred embodiment of the tabulation device according to the present invention;

FIG. 12 is a schematic diagram of one example of the size of text field retained in the text field size retaining unit at the end of practical process in one exemplary operation of the first preferred embodiment of the tabulation device according to the present invention;

FIG. 13 is an example of table formed during the practical process in one exemplary operation of the first preferred embodiment of the tabulation device according to the present invention;

FIG. 15 is a schematic diagram showing one variation of the size of text field retained in the text field size retaining unit during the practical process in one exemplary operation of the second preferred embodiment of the tabulation device according to the present invention;

FIG. 18 is a schematic diagram showing one exemplary variation of the size of text field retained in the text field size retaining unit and the upper limit of column width retained in the retaining column width upper limit retaining unit during the practical process in one exemplary operation of the third preferred embodiment of the tabulation device according to the present invention;

FIG. 20 is a schematic diagram showing one exemplary variation of the size of text field retained in the text field size retaining unit during the practical process in one exemplary operation of the fourth preferred embodiment of the tabulation device according to the present invention;

FIG. 21 is an example of table formed during the practical process in one exemplary operation of the fourth preferred embodiment of the tabulation device according to the present invention;

FIG. 26 is a schematic diagram showing one variation of column size retains in the column size retaining unit during the practical process in one exemplary operation of the fifth preferred embodiment of the tabulation device according to the present invention; and FIG. 27 is one example of table generated during the practical process in one exemplary operation of the fifth preferred embodiment of the tabulation device according to the present invention.

DETAILED DESCRIPTION OF THE PREFERRED EMBODIMENTS

Figures 1, 2:
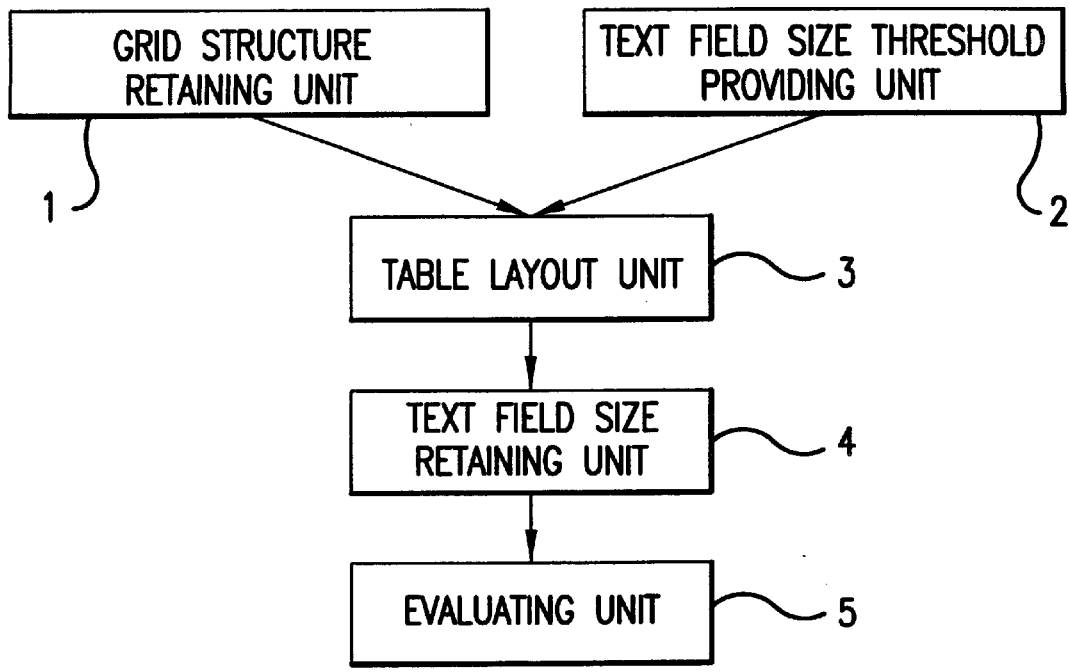
FIG. 1 is an overview of first preferred embodiment of the tabulation device according to the present invention.
FIG. 2 is a schematic diagram of one exemplary table.

FIG. 1 is an overview of first preferred embodiment of the tabulation device according to the present invention. In the figure, reference numeral 1 designates a grid structure retaining unit, 2 to text field size threshold providing unit, 3 table layout unit, 4 text field size retaining unit, and 5 evaluation unit. The arrows in the figure means the flow of data.

Figures 5, 6A, 6B:
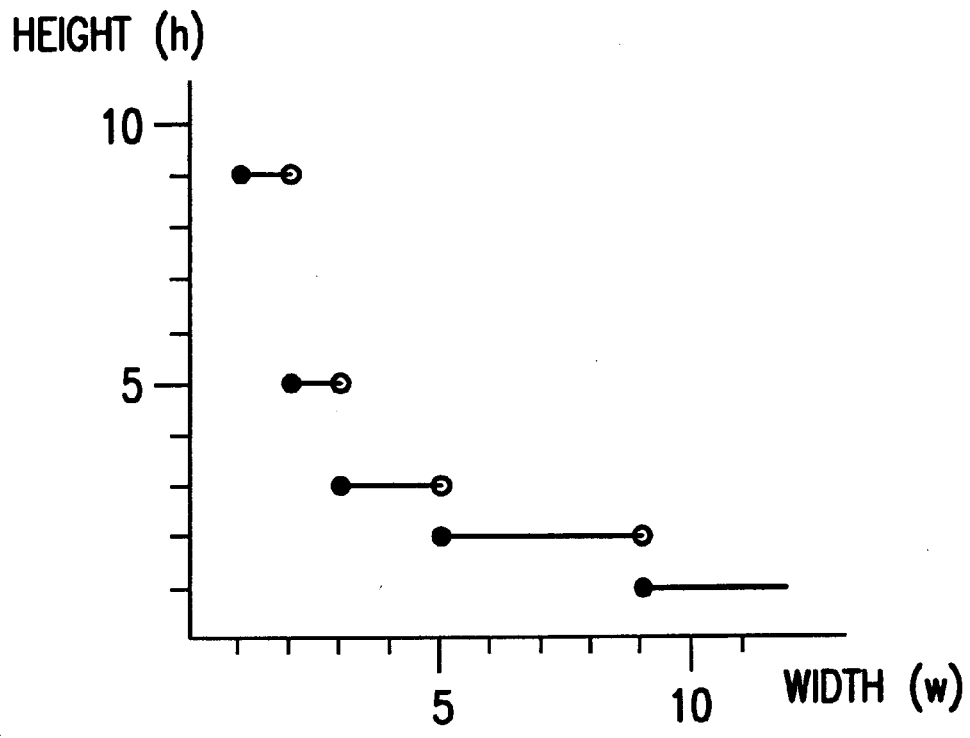
FIG. 5 is a schematic diagram illustrating one example of line-breaking function.

The grid structure retaining unit 1 retains the relative positional relationship of the cells in a table and the text string to be laid out to each cell. FIG. 6 is a schematic diagram of one example of grid structure information retained in the grid structure retaining unit 1 of the first preferred embodiment of the tabulation device according to the present invention. FIG. 6A depicts the table structure to which the text string is laid out. In this example shown in FIG. 6A, the table has a 3 by 3 matrix. However, it should be noted that the table is to not be limited to the simple matrix form as shown, and may be in another form, more complex form, including cell structure with multicolumn or multirow. Although, in FIG. 6A, the table is shown as the form of matrix table, the table comprises in practice such information as on the relative position of each cell and on adjacent cells. In the example shown in FIG. 6A, text string number indicating the string to be laid out is shown for each respective cell. The expression may be formed by, other than the string number, avariety of data structure such as that having pointer pointing to the text string as information contained in a cell.

As shown in FIG. 6B, each cell retains a text string to be laid out, which corresponds to each string number. Although, all characters have same size in FIG. 6B, the character size is not to be necessarily uniform. In addition, the text string portion may contain a plurality of non-splitable characters such as a formula, or a drawing, or an image. In such a case, non-splitable block may be considered to be counted as one character. In the following description the term "text string" may contain a non-splitable block such as an image.

For respective text string to be arranged into a table, the text field size threshold providing unit 2 retains a set of rectangular area size composed of pair of width and height at respective discontinuous points in a function providing the minimum height of rectangular area required for laying out the text strings, when the width of the area is given.

Figures 7, 8:
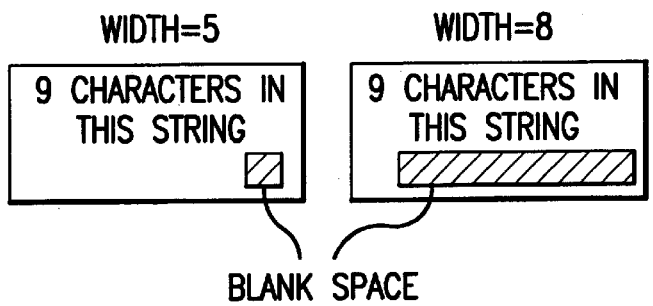
FIG. 7 shows an example of line-breaking.
FIG. 8 shows a schematic diagram of one example of the threshold value of the size of text field retained in text field size threshold providing unit in the first preferred embodiment of the tabulation device according to the present invention.

FIG. 7 is an example of line-breaking. As stated above, the line-breaking function is a stepping function. In general, as a table is considered better not to have waste blank space, width should be as small as possible for the same height. Then, for a width in a range of $W_i \leq W < W_{i+1}$, $W=W_i$ is the best. For example in the line-breaking function shown in FIG. 5, the width is 5 or more and less than 9 when the height is 2. In this example if the width is set to 8 to fill with a text string, the result will be as shown on the left in FIG. 7. The result as shown on the left in FIG. 7 has more waste space than when the width is 5 as shown on the right in FIG. 7. When considering "the most desirable widths" for respective each steps of line-breaking function, one can see that these widths are given as "discontinuous point of the line-breaking function". The text field size threshold providing unit 2 retains these discontinuous points of line-breaking function. The method for determining a set of sizes of rectangular area when the text strings are fixed is disclosed in the Japanese Published Unexamined Patent Application No. Hei 7-334490 as cited above.

For a given column of a table, when the width of the column does not match any one of discontinuous points of the line-breaking function of each text string included in the column, if a rectangular area is assumed which encompasses each text string, and has a width equal to the width of the column and a minimum height, it will be clear that there are waste blank spaces in each of rectangular areas and that the blank space may be reduced by shrinking the width of the rectangular area without changing the height of the rectangular area. By eliminating the blank spaces, the column width will match to one or more of discontinuous points of the line-breaking function of individual text string included in the column when the waste blank space may not be decreased. From this standpoint, by performing layout by using discontinuous points of line-breaking function, a table may be formed which contains "the most desirable width" in which the waste blank space may not be further decreased. This also applies to any row as well.

FIG. 8 shows a schematic diagram of one example of the threshold value of the size of text field retained in the text field size threshold providing unit 2 means in the first preferred embodiment of the tabulation device according to the present invention. The text field size threshold providing unit 2 retains the size threshold value of the text field in such a form as shown in FIG. 8, for example. Here, each size threshold value of the respective text fields is shown in relation to a concrete example of the text string retained in the grid structure retaining unit 1 as shown in FIG. 6B. A leftmost column of FIG. 8 indicates the number of text strings for corresponding to the text strings shown in FIG. 6B. A rightmost column of FIG. 8 indicates the threshold value of the text field size, in which by way of an example, the text string has a fixed font size and fixed pitch, and the discontinuous points of the line-breaking function are indicated as the number of characters for the convenience. In practice, there may be a case that the size or the pitch of characters are not uniform. In such a case, a predetermined unit of length may be used.

For example, the string of the text string number 3 has nine characters. Its line-breaking function may be as shown in FIG. 5, and five discontinuous points (width=1, height=9), (width=2, height=5), (width=3, height=3), (width=5, height=2), (width=9, height=1) are retained as threshold values of the size of text field in the text field size threshold providing unit 2.

Figures 9, 10:
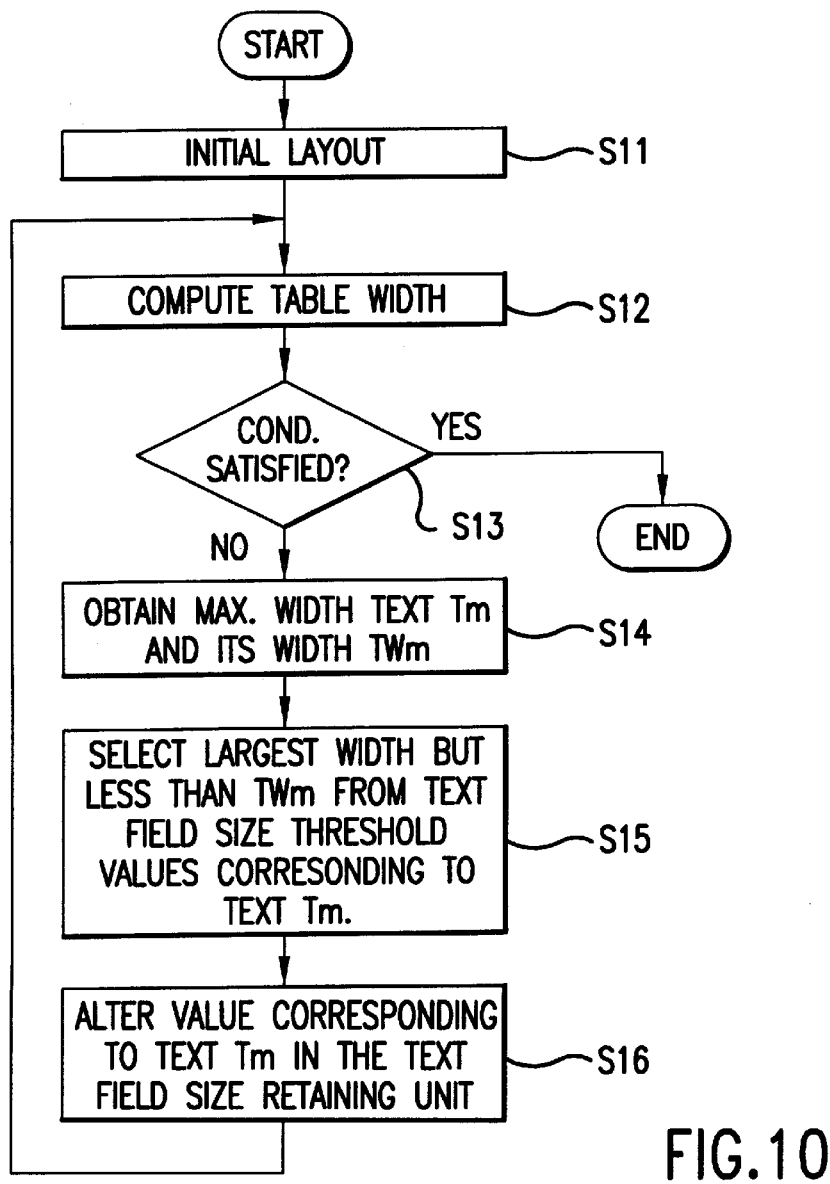
FIG. 9 shows a schematic diagram of one example of the size of text field retained in text field size retaining unit in the first preferred embodiment of the tabulation device according to the present invention.
FIG. 10 is a flowchart illustrating one exemplary operation in the first preferred embodiment of the tabulation device according to the present invention.

The text field size retaining unit 4 stores the text field size for each text string, which is a correspondence to one of values in the text field size threshold providing unit 2. FIG. 9 shows a schematic diagram of one example of the size of text field retained in the text field size threshold retaining unit 4 in the first preferred embodiment of the tabulation device according to the present invention. In this example, the left column (text string numbers) specifies a text string, and the right column (text field size) contains the threshold value of the size of text field with the height=1 which is selected from the threshold value of the size of the text field corresponding to the text string and retained in the text field size threshold providing unit 2 are retained.

The layout unit 3 performs table layout by adding or changing the correspondence of the text string retained in the text field size retaining unit 4 and the size of text field.

The layout evaluation unit 5 evaluates a table or a part thereof, according to predetermined conditions, from the text field size retained in the text field size retaining unit 4, to allow the table layout unit 3 to re-lay out the table if necessary.

FIG. 10 is a flowchart illustrating one exemplary operation in the first preferred embodiment of the tabulation device according to the present invention. Here the layout of text string is performed such that, as a concrete example, the width of the table is less than or equal to 15 characters.

In Step S11, the table layout unit 3 performs default layout. In the default layout the threshold value with the maximum width for each text is selected among the threshold values of the text field size retained in the text field size threshold providing unit 2 and stored as the text field size in the text field size retaining unit 4 by corresponding to the text.

Next, the layout evaluation unit 5 evaluates the layout result of the table. In this example as a condition that the width of the table is less than or equal to 15 characters is given, the layout evaluation unit 5 evaluates whether the table width is less than or equal to 15 characters. In Step S12 the table width is calculated, then in Step S13 the layout evaluation unit 5 evaluates whether the computed result satisfies the supplied condition.

The computing method of table width performed in Step S12 will be described. Here the term "text width" refers to the width component of the text field size with respect to the text string retained in the text field size retaining unit 4, and similarly, "text height" refers to the height component of the text field size. The table width will be determined by determining width of each column then adding them together. If each column is numbered from left to right, then column width will be determined as follows starting from the column 1:

column i width=max (least width of the column i for the cell j, whose right side overlaps the column i).

Where "least width of the column i for the cell j" is:

$$W_j - \sum_{k=F_j}^{i-1} CW_k$$

Where $W_j$ is the text string width to be laid out in the cell j, $F_j$ is the column number at the leftmost to the cell j, and $CW_k$ is the column width of column. Which text string is contained in which column may be found from the contents stored in the grid structure retaining unit 1. By computing as stated above, each column width may be determined even when multicolumn cells are present.

Next, in Step S13, it will be evaluated whether the table width computed in Step S12 is less than or equal to 15, and the layout terminates if so. If not, the layout evaluation unit 5 directs the table layout unit 3 to iterate the re-layout process of Steps S14 to S16.

In the re-layout process, in Step S14, table layout unit 3 compares widths with each other between each text string to retrieve a text $T_m$ which has a widest width and its width $TW_m$. In Step S15, from within the text field size threshold values corresponding to the text $T_m$ retained in the text field size threshold providing unit 2, one which has a width narrower than the field width $TW_m$ and wider than others is selected. In other words, table layout unit 3 selects a text field size $S_i$ among sizes $S_i, \ldots, S_o$ which are provided by the text field size threshold providing unit 2 for $T_m$. In this case, the unit selects the $S_i$ which satisfies $$(width\,(S_i) < TW_m) \wedge \forall\, j \in \{1, \ldots, o\}$$
$$(width\,(S_j) \leq width\,(S_i) \vee TW_m \leq width\,(S_j))$$

where width $(S_k)$ is the width of $S_k$.

In Step S16, the text field size corresponding to the text Tm in the text field size retaining unit 4 is altered to the text field size threshold value selected in Step S15. Once the re-layout is terminated, the process returns to Step S12.

The above mentioned operation for layout process will be further described by using a concrete example. FIG. 11 is a schematic diagram showing one example of the size of text field retained in text field size retaining unit 4 during the practical process in one exemplary operation of the first preferred embodiment of the tabulation device according to the present invention, FIG. 12 is a schematic diagram of one example of the size of text field retained in the text field size retaining unit at the end of practical process in one exemplary operation of the first preferred embodiment of the tabulation device according to the present invention, and FIG. 13 is an example of table generated during the practical process in one exemplary operation of the first preferred embodiment of the tabulation device according to the present invention.

At a default state, the grid structure retaining unit 1 and the text field size threshold providing unit 2 are assumed to retain grid structure information as shown in FIG. 6, and a text field size threshold value as shown in FIG. 8, respectively. In addition, the text field size retaining unit 4 retains nothing.

In Step S11, the layout unit 3 performs default layout. As a result, text field size corresponding to respective text string as shown in FIG. 9 is retained in the text field size retaining unit 4.

Then, in Step S12, the layout evaluation unit 5 computes the table width. As the text number of cells included in the column 1 are 1, 4, and 7 as shown in FIGS. 6(A) and 6(B), their widths determined from the text field size retaining unit 4 are 3, 8, and 8. The maximum value is 8 so that the column width of the column 1 will be 8. Similarly, the column width of column 2 will be 7, and the column width of column 3 will be 9. From the values of the column width of the columns 1, 2 and 3 the table width will be 24. Next, in Step S13, it will be evaluated whether the table width is less than or equal to 15. The table width is neither less than nor equal to 15 in this case, so the layout evaluation unit 5 enables the layout unit 3 to process re-layout.

The layout unit 3, in Step S14, compares widths for respective text strings with each other, to retrieve the text $T_m$ with the largest width and its width $TW_m$. In this example the text string of the number 3 has the largest width which is 9, this text number and its width will be retrieved. In Step S15, one having a width less than or equal to 9 and larger than others will be selected from the text field size threshold values corresponding to the text number 3 retained in the text field size threshold providing unit 2. In other words, table layout unit 3 selects a text field size $S_i$ among sizes $S_1$, ..., $S_o$ which are provided by the text field size threshold providing unit 2 for the third text. In this case, the unit selects the $S_i$ which satisfies $$(width(S_i) < 9) \wedge \forall j \in \{1, ..., o\}$$
$$(width(S_j) \leq width(S_i) \vee 9 \leq width(S_j))$$

where width ($S_k$) is the width of $S_k$.

Because of the corresponding value is (width=5, height=2), this value will be selected. In Step S16, the text field size corresponding to the text number 3 in the text field size retaining unit 4 is altered to the text field size threshold value selected In Step S15 (width=5, height=2). This changes the text field size retained in the text field size retaining unit 4 as shown in FIG. 11.

By returning to step S12 at this point another table width according to a new text field size shown in FIG. 11 retained in the text field size retaining unit 4 will be computed. A new table width is 21, which is not less than or equal to 15 (see step S13), and therefore the re-layout will be continued.

Thereafter, the text field sizes for the text number 4, 7, and 8 retained in the text field size retaining unit 4 will be altered. Consequently, the text field sizes retained in the text field size retaining unit 4 will be changed as shown in FIG. 12. The table width at this point will be 15, which is less than or equal to 15, then the layout will be completed.

In order to create a table in practice, the column width of each column and the row height of each row are determined from the text field size as shown in FIG. 12 and obtained in the layout process as described above, based on the grid structure information retained in the grid structure retaining unit 1 to generate table structure to arrange text strings into each cell. FIG. 13 shows a table formed in this way.

In the example shown in FIG. 13, each text string to be arranged into each cell is laid out according to the text field size retained in the text field size retaining unit 4. Thus in the text number 3 or 8, however, the column width are 5 and 4 respectively, the strings are line broken by 4 and 5 characters, respectively. Other than the text arrangement as shown, text strings may be laid out to cells by arranging according to each column width.

Next, second preferred embodiment of the tabulation device according to the present invention will be described. The second embodiment has the same structure to the first preferred embodiment as described above. In the first embodiment as above, text strings are arranged to every cells at first, then widths are adjusted by observing the entire table. In the second embodiment, however, text layout will be performed part by part.

Figure 14:
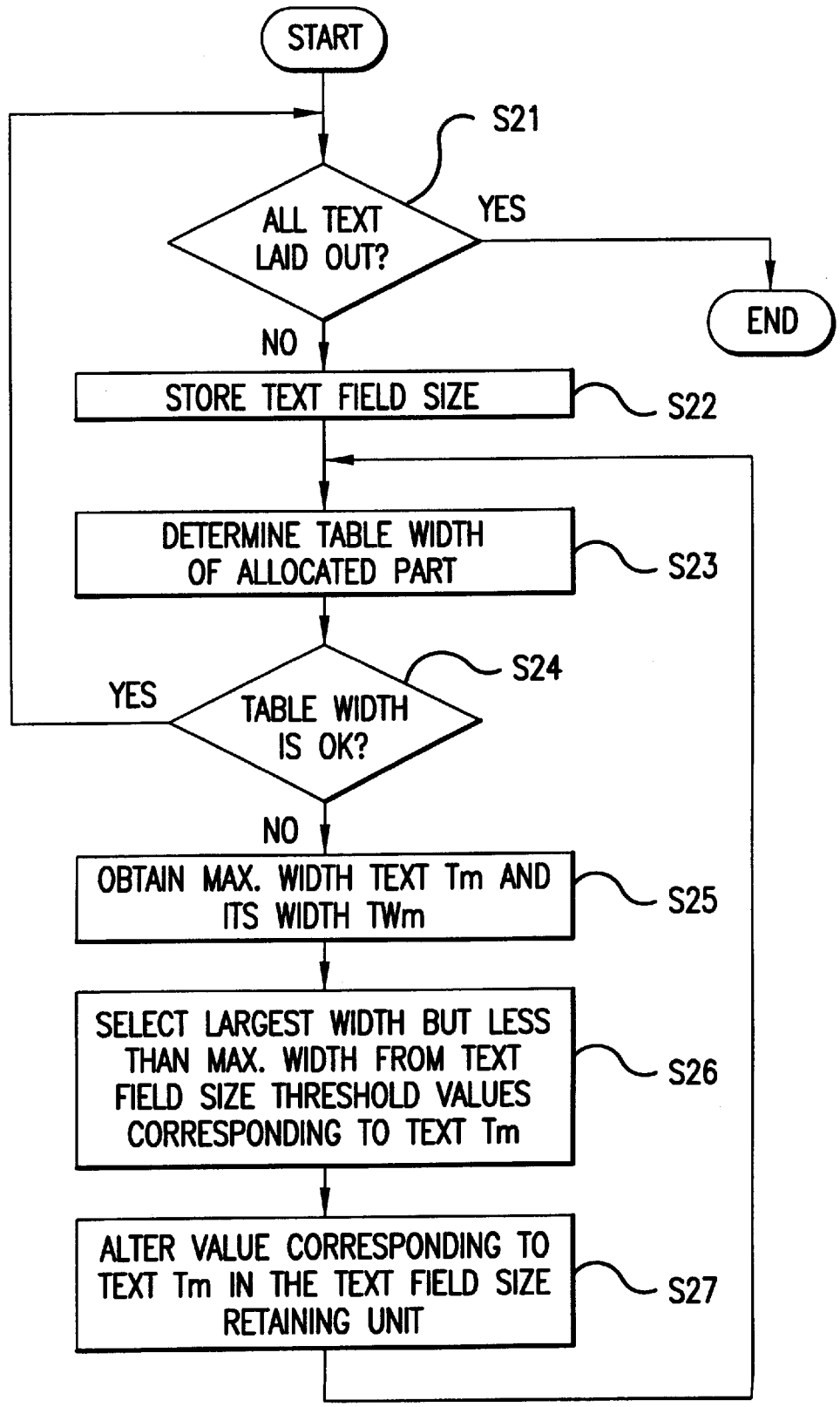
FIG. 14 is a flowchart illustrating one exemplary operation in second preferred embodiment of the tabulation device according to the present invention.

FIG. 14 is a flowchart illustrating one exemplary operation in a second preferred embodiment of the tabulation device according to the present invention. In this embodiment, the layout is assumed to be performed so that a table width is less than or equal to 15 characters.

In Step S21, the table layout unit 3 determines whether or not all text strings are already laid out to a table, i.e., whether all text strings correspond to a text field size threshold value at the text field size retaining unit 4. If so, the layout process terminates.

If, on the other hand, there are text strings not laid out yet, in Step S22, the layout unit 3 selects the uppermost one of the rows containing cell(s) not laid out, and also select, for respective text strings of the cells in that row, the text field size threshold value of the largest width for each text string among the text field size threshold values retained in the text field size threshold providing unit 2, then store the text field size threshold value as the text field size in the text field size retaining unit 4 in corresponding to a text string.

Then, the layout evaluation unit 5 evaluates the layout result of the part of table already laid out. Here it evaluates whether or not the table width is less than or equal to 15 characters. At first in Step S23, the table width of the laid out part of table will be determined. The process for determining is identical to that performed in Step S12 of the first preferred embodiment as described above. Next, in Step S24, it will be evaluated whether or not the preevaluated table width is less than or equal to 15 characters, and if so the process returns to step S21 for determining the completion of layout. If not, then the re-layout process in Steps S25 to S27 will be performed.

In the re-layout process, the layout unit 3 compares, in Step S25, the widths of laid out text strings with each other to retrieve the text $T_m$ having the largest width and its width $TW_m$. In Step S26, the largest one of the text field size threshold values of width less than $TW_m$ from the text field size threshold values corresponding to the text $T_m$ retained in the text field size threshold providing unit 2 will be selected. In other words, the table layout unit 3 selects a text field size $S_i$ among sizes $S_1$, ..., $S_o$ which are provided by the text field size threshold providing unit 2 for $T_m$. In this case, the unit selects the $S_i$ which satisfies $$(width(S_i) < TW_m) \wedge \forall j \in \{1, \ldots, o\}$$

$$(width(S_j) \le width(S_i) \vee TW_m \le width(S_j))$$

where width ($S_k$) is the width of $S_k$.

In Step S27, text field size value corresponding to the text $T_m$ in the text field size retaining unit 4 will be altered to the text field size threshold value selected in Step S26. Once re-layout completed, the process returns to step S23 to again evaluate whether the condition is satisfied.

In the case in which text layout is performed for the table shown in FIG. 6A, in the concrete example used in the first preferred embodiment as described above, text numbers 1, 2, and 3 will be laid out at first, then re-laid out if necessary so as to satisfy the given condition. Once laid out so as to satisfy the condition, then text numbers 4, 5, and 6 will be laid out, and re-layout of text numbers 1 through 6 will be performed so as to satisfy the condition. Thereafter, text numbers 7, 8, and 9 will be laid out, and all texts will be subject to be re-laid out if necessary, so as to satisfy the condition.

FIG. 15 is a schematic diagram showing one variation of the size of text field retained in the text field size retaining unit during the practical process in one exemplary operation of the second preferred embodiment of the tabulation device according to the present invention. Similar to the first embodiment as above, at the default state, the grid structure retaining unit 1 and text field size threshold providing unit 2 retain the grid structure information as shown in FIG. 6, and text field size threshold value as shown in FIG. 8, respectively. In addition, the text field size retaining unit 4 retains nothing.

At first the text numbers 1, 2, and 3 will be laid out to evaluate whether the condition is satisfied. As the table width is 16, re-layout process will be performed and the text field size of the text number 3 will be altered, so that the contents of the text field size retaining unit 4 will be as shown in FIG. 15A.

Second, the text numbers 4, 5, and 6 will be laid out to evaluate whether the condition is satisfied. As the table width is 18, then re-layout process will be performed and at this time the text field size of the text number 4 will be altered. The contents of the text field size retaining unit 4 will be thereby as shown in FIG. 15B.

Further, the text numbers 7, 8, and 9 will be laid out to evaluate whether the condition is satisfied. As the table width is 21, then re-layout will be performed, the text field size of the text number 7 will be altered. As the condition is not yet satisfied at this point, the text field size of the text number 8 will be altered. In this manner, similar to the first preferred embodiment as above, the text field size shown in FIG. 12 will be retained in the text field size retaining unit 4 to form a table as shown in FIG. 13.

Figures 15A, 15B, 16:
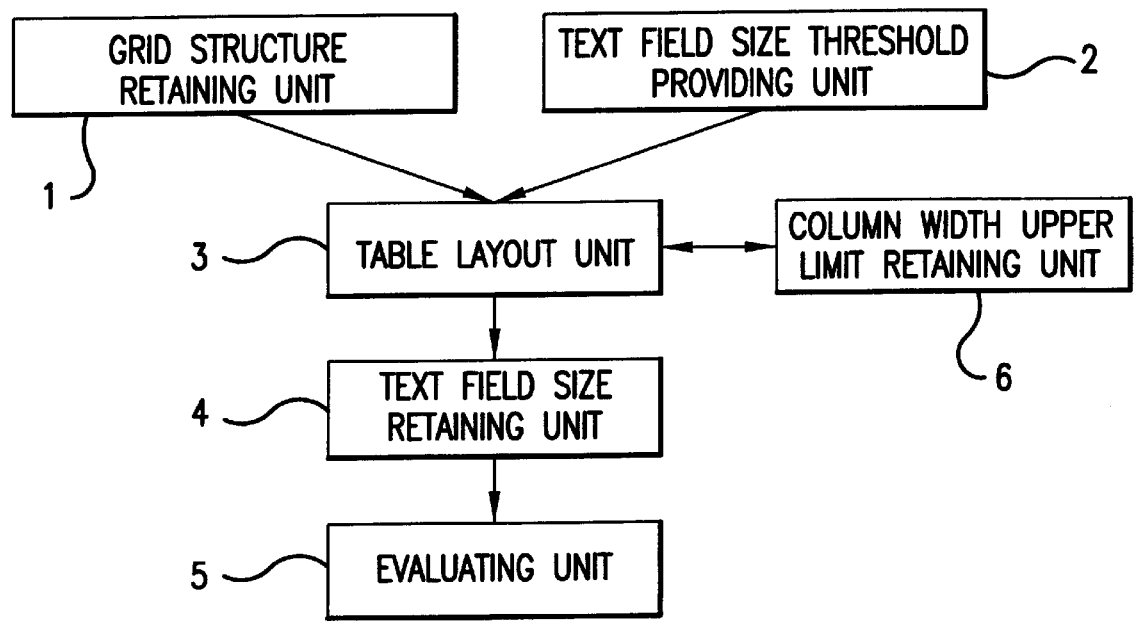
FIG. 16 is an overview illustrating third preferred embodiment of the tabulation device according to the present invention.

FIG. 16 is an overview illustrating third preferred embodiment of the tabulation device according to the present invention. In this figure, like numerals refer to same components for the purpose of simplifying the description. Reference numeral 6 designates a column width upper limit retaining unit 6. In this third embodiment, an example of layout process is shown in order to prevent a text width in one column from excessively differing from others to degrade the appearance of the table.

In the third embodiment, there is a row width upper limit retaining unit 6. The row width upper limit retaining unit 6 retains the upper limit of column width for each column. The upper limit of column width are set to 1.5 times the minimum text width in each column. It is to be noted that a variety of values may be set.

Figure 17:
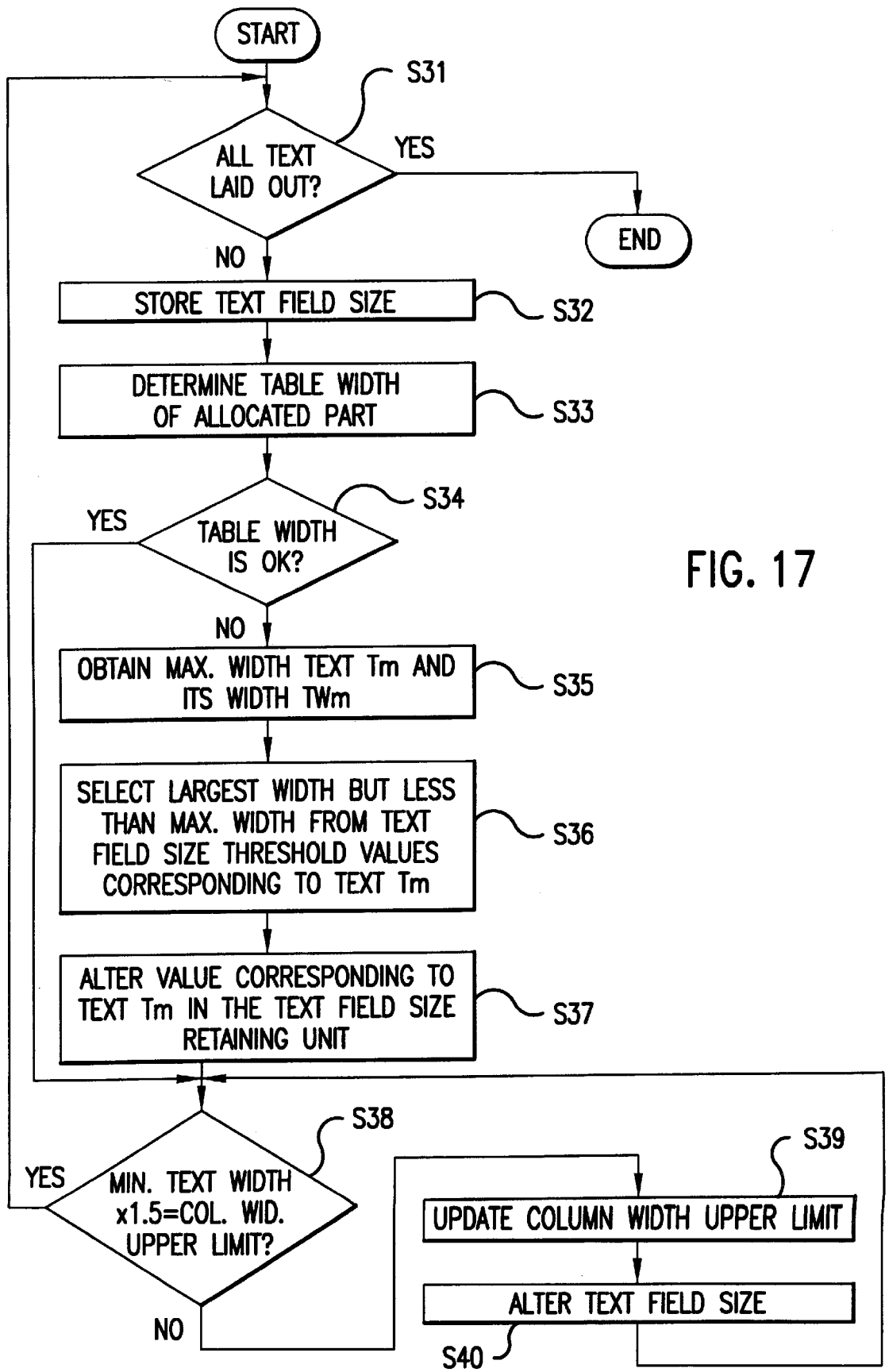
FIG. 17 is a flowchart illustrating one exemplary operation in the third preferred embodiment of the tabulation device according to the present invention.

FIG. 17 is a flowchart illustrating one exemplary operation in the third preferred embodiment of the tabulation device according to the present invention. Here it is assumed that the table width is less than or equal to 15 characters, and text layout will be performed such that the maximum to minimum ratio of the text width in one column should not more than 1.5. The initial value of the upper limit retained in the column width upper limit retaining unit 6 is a value indicating "infinite".

In Step S31, the layout unit 3 evaluates whether or not all of the text strings are laid out in the table, i.e., whether all text strings correspond to a text field size threshold value in the text field size retaining unit 4. If all text strings are laid out, the process will be terminated.

If there are text strings not yet laid out, In Step S32, the uppermost row of the rows containing a cell not yet laid out will be selected, to select for each text string in the cells contained in that row, the text field size threshold value less than the column width upper limit retained in the row width upper limit retaining unit 6 with largest width of the column containing that text from within the text field size threshold values retained in the text field size threshold providing unit 2. In other words, a text field size $S_i$ among sizes $S_1, \ldots, S_o$ which are provided by the text field size threshold providing unit 2 for the text. In this case, the table layout unit 3 selects the $S_i$ which satisfies $$\forall j \in \{1, \ldots, o\} (width(S_j) \le width(S_i) \vee upper_T < width(S_j))$$

where width ($S_k$) is the width of $S_k$ and $upper_t$ is the column width upper limit retained in the column width upper limit retaining unit 6 for the column which contains the text.

The table layout unit stores it in the text field size retaining unit 4 as text field size in corresponde to a text string.

Then, the layout evaluation unit 5 evaluates the layout result of the already laid out part of table to evaluate whether or not the table width is less than or equal to 15. In Step S33, the table width of laid out part will be determined. This process is identical to the process in Step S12 of the first embodiment as described above. Then, in Step S34, it will be evaluated whether the table width determined in Step S33 is less than or equal to 15. If so the process proceeds to step S38 to evaluate whether the column width upper limit should be changed, and if not the process proceeds to re-layout process in Steps S35 through S37.

The re-layout will be as follows. In Step S35, widths each with other of laid out text strings are compared with each other to retrieve the text $T_m$ having the largest width and its field width $TW_m$. In Step S36, the largest one of the text field size threshold values of width less than the field width $TW_m$ from the text field size threshold values corresponding to the text string $T_m$ retained in the text field size threshold providing unit 2 will be selected. In other words, table layout unit 3 selects a text field size $S_i$ among sizes $S_1, \ldots, S_o$ which are provided by the text field size threshold providing unit 2 for $T_m$. In this case, the unit selects the $S_i$ which satisfies $$(width(S_i) < TW_m) \wedge \forall j \in \{1, \ldots, o\}$$

$$(width(S_j) \le width(S_i) \vee TW_m \le width(S_j))$$

where width ($S_k$) is the width of $S_k$.

In Step S37, text field size value corresponding to the text Tm in the text field size retaining unit 4 will be altered to the text field size threshold value selected in Step S36. Once re-layout completed, the process proceeds to step S38.

In Step S38, it will be evaluated whether the column width upper limit retained in the column width upper limit retaining unit 6 should be altered. In this example, it will be evaluated whether or not there is a column i which satisfies $$Cmin_i \times 1.5 = upper_i$$

where $Cmin_i$ is the width of the narrowest text in the column and $upper_i$ is the column width upper limit for the column. If not, the process returns to step S31 since the change of column width upper limit is not needed. If so, because this indicates that there exists a column whose narrowest text width has been altered, following steps updates the column width upper limit.

In Step S39, each column width upper limit retained in the row width upper limit retaining unit 6 is set to a value of 1.5 times of the narrowest text width in that column. In Step S40, text field size will be determined according to the new column width upper limit. That is, for text strings already laid out, if the text width exceeds the column width upper limit in that column, the text field size corresponding to the text retained in the text field size retaining unit 4 is altered to that of the largest width among the ones of width less than column width upper limit in the text field size threshold value corresponding to the text retained in the text field size threshold providing unit 2. In other words, defined a text field size as $S_i$ among sizes $S_1, \ldots, S_o$ which are provided by the text field size threshold providing unit 2 for the text, in this case, the table layout unit 3 selects the $S_i$ which satisfies $$\forall\, j \in \{1, \ldots, o\}(width\,(S_j) \leq width\,(S_i) \vee upper_T < width\,(S_j))$$

where width $(S_k)$ is the width of $S_k$ and $upper_T$ is the column width upper limit retained in the column width upper limit retaining unit 6 for the column which contains the text.

The process returns to step S38 to evaluate whether or not the column width upper limit should be updated.

FIG. 18 is a schematic diagram showing one exemplary variation of the size of text field retained in the size of text field retaining unit and the upper limit of column width retained in the column width upper limit retaining unit during the practical process in one exemplary operation of the third preferred embodiment of the tabulation device according to the present invention. As similar to the first embodiment, in the initial state, the grid structure retaining unit 1 and the text field size threshold providing unit 2 retains grid structure information as shown in FIG. 6 and text field size threshold value as shown in FIG. 8, respectively. In addition, the text field size retaining unit 4 retains nothing, and the column width upper limit retaining unit 6 retains "infinite" as the column width upper limit for each column.

At first text numbers 1, 2, and 3 will be laid out to evaluate whether the condition is satisfied. As the table width is 16, re-layout will be performed to alter the text field size of the text number 3, and the contents of the text field size retaining unit 4 will be as shown in FIG. 18A. At this point, it will be evaluated whether there is a column i which satisfies $$Cmin_i \times 1.5 \neq upper_i$$

where $Cmin_i$ is the width of the narrowest text in the column and $upper_i$ is the column width upper limit for the column.

Since the column width upper limit of each column is "infinite", this condition is satisfied, and column width upper limit will be changed. Here, as shown in FIG. 18B, the row width upper limit retaining unit 6 retains values 4.5, 6, and 7.5 which is 1.5 times of the width of respective text string for the text numbers 1, 2, and 3, as the column width upper limits.

Then, text numbers 4, 5, and 6 will be laid out. Under the condition that is less than the column width upper limit as shown in FIG. 18B, the largest text field size threshold value among ones retained in the text field size threshold providing unit 2. For the text number 4, the second largest (width=4, height=2) will be selected instead of the text field size threshold value of the largest width. This results in that the text field size as shown in FIG. 18C will be retained in the text field size retaining unit 4. The table width according to this layout process will be 14, which satisfies the condition, so that the re-layout will not be performed. The column width upper limit will not be altered.

Thereafter, text numbers 7, 8, and 9 will be laid out. For the text numbers 7 and 8, as the text field size threshold value of the largest width retained in the text field size threshold providing unit 2 exceeds the column width upper limit, the second largest ones will be selected. This results in that the text field size as shown in FIG. 12 will be retained in the text field size retaining unit 4, similar to the first embodiment as above. The table width according to this layout is 15, which satisfies the condition, so that the re-layout will not be performed. The column width upper limit also will not be altered. A table shown in FIG. 13 will be created based on such obtained text field size.

Next, a fourth preferred embodiment of the tabulation device according to the present invention will be described below. In the fourth embodiment, when the text field height retained in the text field size retaining unit 4 corresponding to the text strings $T_1, \ldots, T_m$ in one given row in a table is referred to as to $L_1, \ldots, L_m$, for one text $T_i$ in the text strings $T_1, \ldots, T_m$, the layout unit 3 lays out by setting the height $L_i$ of the text $T_i$ such that there is not an L satisfying $L_i < L \leq max\,(L_1, \ldots, L_m)$ in a plurality of heights provided from the text field size threshold providing unit 2 which correspond to the text. For example, when a text string is laid out to a cell in one row and if there is a large waste blank space beneath the laid out text, this embodiment attempts to fill the blank space by adding more line-breaking of the laid out text. That is, the layout unit lays out a group of text strings such that, from within the rectangular area size provided by the text field size supplying unit and corresponding to the text $T_i$, the rectangular area height equals or becomes the nearest to the maximum height of the group of rectangular area sizes. This will result in that the text height in one row will be evenly aligned to be able to obtain a good looking table. If there is an L satisfying $L_i < L \leq max\,(L_1, \ldots, L_m)$, and when the line-breaking function evenly decreases, a table more compact than ever may be obtained, since the text width in case of height L becomes smaller than the case of height $L_i$. The structure in the fourth embodiment is identical to that shown in FIG. 1, the detailed description thereof will be thus omitted.

Figure 19:
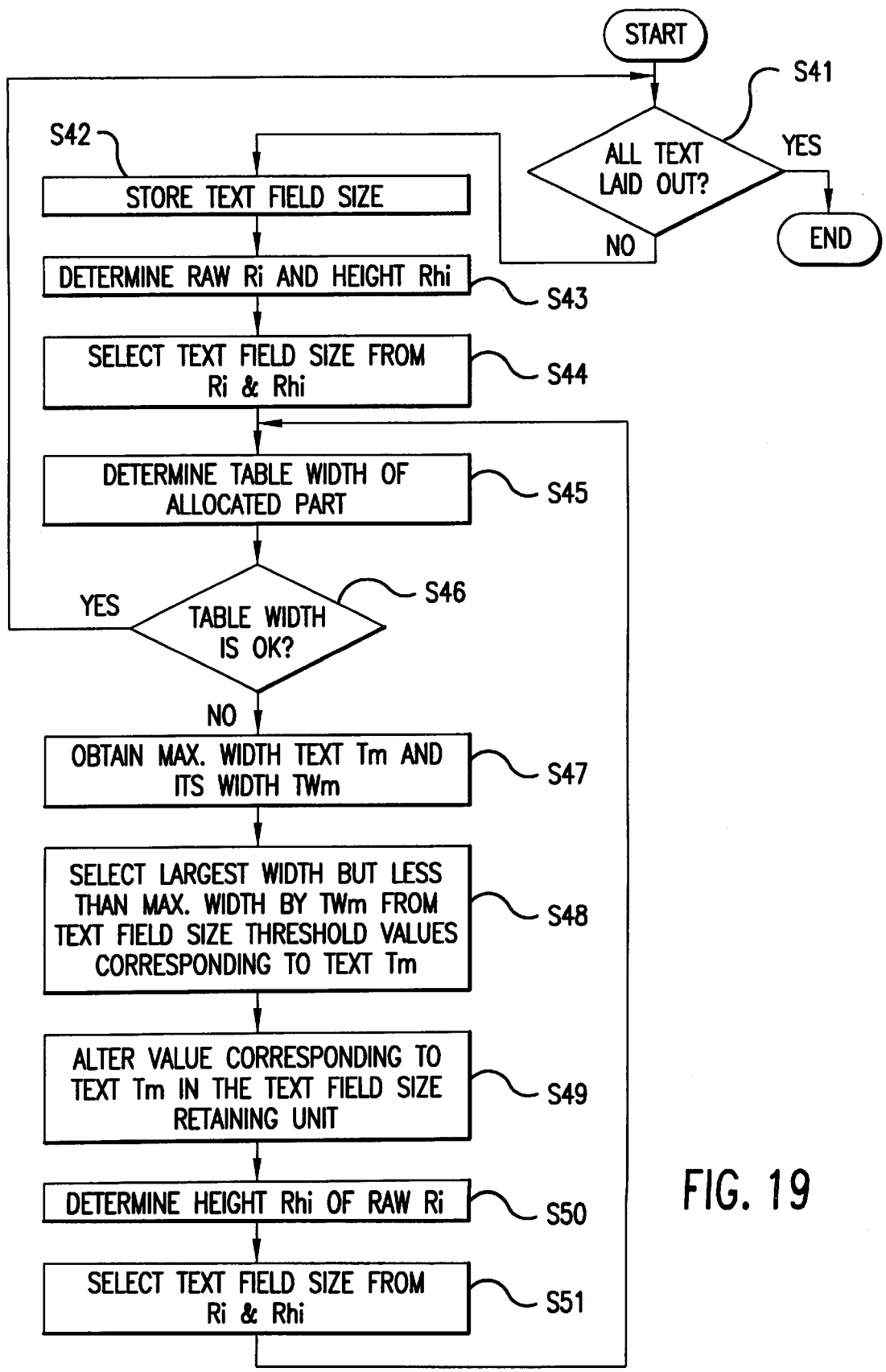
FIG. 19 is a flowchart illustrating one exemplary operation in fourth preferred embodiment of the tabulation device according to the present invention.

FIG. 19 is a flowchart illustrating one exemplary operation in fourth preferred embodiment of the tabulation device according to the present invention. This embodiment also is for table layout with table width being less than or equal to 15 characters.

In Step S41, the layout unit 3 evaluates whether or not all of the text strings are laid out in the table, i.e., whether all text strings correspond to a text field size threshold value in the text field size retaining unit 4. If all text strings are laid out, the process will be terminated.

If there are text strings not yet laid out, in Step S42, the uppermost row $R_i$ of the rows containing a cell not yet laid out will be selected, to select for each text string in the cells contained in that row, the text field size threshold value of the largest width for that text string, from within the text field size threshold values retained in the text field size threshold providing unit 2, to store in the text field size retaining unit 4 as text field size threshold value by corresponding it to a text string.

Next, in Step S43, the height $RH_i$ of the row $R_i$ will be determined by using the method described with reference to the first embodiment as above. Further in Step S44, for each text string in the row $R_i$, the text field size value of the largest height from within ones corresponding to that text string, with height less than the height $RH_i$ is selected from the text field size threshold values in the text field size threshold providing unit 2. In other words, table layout unit 3 selects a text field size $S_i$ among sizes $S_1, \ldots, S_o$ which are provided by the text field size threshold providing unit 2 for the text. In this case, the unit selects the $S_i$ which satisfies $$\forall j \in \{1, \ldots, o\}(height(S_j) \le height(S_i) \vee RH_i < height(S_j))$$

where height $(S_k)$ is the height of $S_k$. The table layout unit stores it in the text field size retaining unit 4 in correspondence to that text.

Next, the layout evaluation unit 5 evaluates the layout result of the already laid out part of table to evaluate whether or not the table width is less than or equal to 15. In Step S45, the table width of laid out part will be determined. This process is identical to the process performed in the first embodiment as described above. In Step S46, it will be evaluated whether the table width determined in Step S45 is less than or equal to 15. If so the process proceeds to step S41 to evaluate whether the layout terminates, and if not the process proceeds to re-layout process as follows.

The re-layout will be as follows. In Step S47, widths of laid out text strings are compared with each other to retrieve the text $T_m$ having the largest width and its width $TW_m$. In Step S48, the largest one of the text field size threshold values of width less than the field width $TW_m$ from the text field size threshold values corresponding to the text string $T_m$ retained in the text field size threshold providing unit 2 will be selected. In other words, table layout unit 3 selects a text field size $S_i$ among sizes $S_i, \ldots, S_o$ which are provided by the text field size threshold providing unit 2 for $T_m$. In this case, the unit selects the $S_i$ which satisfies $$(width(S_i) < TW_m) \wedge \forall j \in \{1, \ldots, o\}$$
$$(width(S_j) \le width(S_i) \vee TW_m \le width(S_j))$$

where width $(S_k)$ is the width of $S_k$.

In Step S49, text field size value corresponding to the text $T_m$ in the text field size retaining unit 4 will be altered to the text field size threshold value selected in Step S48.

Next, in Step S50, the height $RH_i$ of the row $R_i$ which contains the re-laid out text will be determined by using the method disclosed in the first embodiment as above. In Step S51, for each text string in the row $R_i$, the text field size value of the largest height from within ones corresponding to that text string, with height less than $RH_i$ is selected from the text field size threshold values in the text field size threshold providing unit 2. In other words, defined a text field size as $S_i$ among sizes $S_1, \ldots, S_o$ which are provided by the text field size threshold providing unit 2 for the text, in this case, the table layout unit 3 selects the $S_i$ which satisfies $$\forall j \in \{1, \ldots, o\}(height(S_j) \le height(S_i) \vee RH_i < height(S_j))$$

where height $(S_k)$ is the height of $S_k$.

The table layout unit stores in the text field size retaining unit 4 by corresponding to that text. Here again, the process returns to step S45 for determining whether or not the condition is satisfied.

FIG. 20 is a schematic diagram showing one exemplary variation of the size of text field retained in the text field size retaining unit during the practical process in one exemplary operation of the fourth preferred embodiment of the tabulation device according to the present invention. FIG. 21 is an example of table thus generated during the practical process in one exemplary operation of the fourth preferred embodiment of the tabulation device according to the present invention. Similar to the first embodiment, in the initial state, the grid structure retaining unit 1 and the text field size threshold providing unit 2 retains grid structure information shown in FIG. 6 and text field size threshold value as shown in FIG. 8, respectively. In addition, the text field size retaining unit 4 retains nothing.

At first, text numbers 1, 2, and 3 will be laid out to evaluate whether the condition is satisfied. As the table width is 16, a re-layout will be performed to alter the text field size of the text number 3. Because the height of the first line will be 2, as a result of re-lay out the string of the text number 3, the highest text field size threshold value which has height less than 2 will be selected. This causes (width=2, height=2) for the text number 1 and (width=2, height=2) for the text number 2 to be selected. Thereafter the contents of the text field size retaining unit 4 will be as shown in FIG. 20A.

Next, text numbers 4, 5, and 6 will be laid out, and the compliance to the condition will be examined. As the table width is 18 here, a re-layout will be performed to alter the text field size of the text number 4. By the fact that the height of the text number 4 will be 2, the highest text field size threshold value which has height less than 2 will be selected for the text numbers 5 and 6, so that (width=3, height=2) will be selected for both the text numbers 5 and 6. Thereafter the contents of the text field size retaining unit 4 will be as shown in FIG. 20B.

Furthermore, text numbers 7, 8, and 9 will be laid out and the compliance to the condition will be examined. As the table width is 21 here, a re-layout will be performed to alter the text field size of the text number 7. By the fact that the height of the text number 7 will be 2, the highest text field size threshold value which has height less than 2 will be selected for the text numbers 8 and 9, so that (width=4, height=2) will be selected for the text numbers 8, and (width=3, height=2) for the text number 9. At this point the table width will be 13 and satisfies the condition. In this manner, the text field sizes shown in FIG. 20C are stored in the text field size retaining unit 4 to create a table as shown in FIG. 21.

In the fourth embodiment, by increasing line-breaking as much as possible, text width may be decreased if the line-breaking function is monotone decreasing, so that a compact table will be created. If the line-breaking function is not monotone decreasing, there may be a case which allows text width to be increased, by increasing line-breaking. This does not comply to the object of providing a compact table. In order to provide a compact table even if the line-breaking function is not monotone decreasing, the text line-breaking may be increased within a range that the text width decreases. Thus, by defining the heights as $H_1, \ldots, H_m$ and the widths as $W_1, \ldots, W_m$ of the text field retained in text field size retaining unit corresponding to the text strings $T_1, \ldots, T_m$ in one given row in a table, for a given text $T_i$ from within the text strings $T_1, \ldots, T_m$, the text string $T_i$ is to be laid out to the table so as not to present a width $W_j$, and a height $H_j$ satisfying $W_j < W_i$, and $H_j \leq \max(H_1, \ldots, H_m)$ in the sizes of rectangular area provided by the text field size threshold providing unit 2 to the text string Ti.

Figures 22, 23, 24:
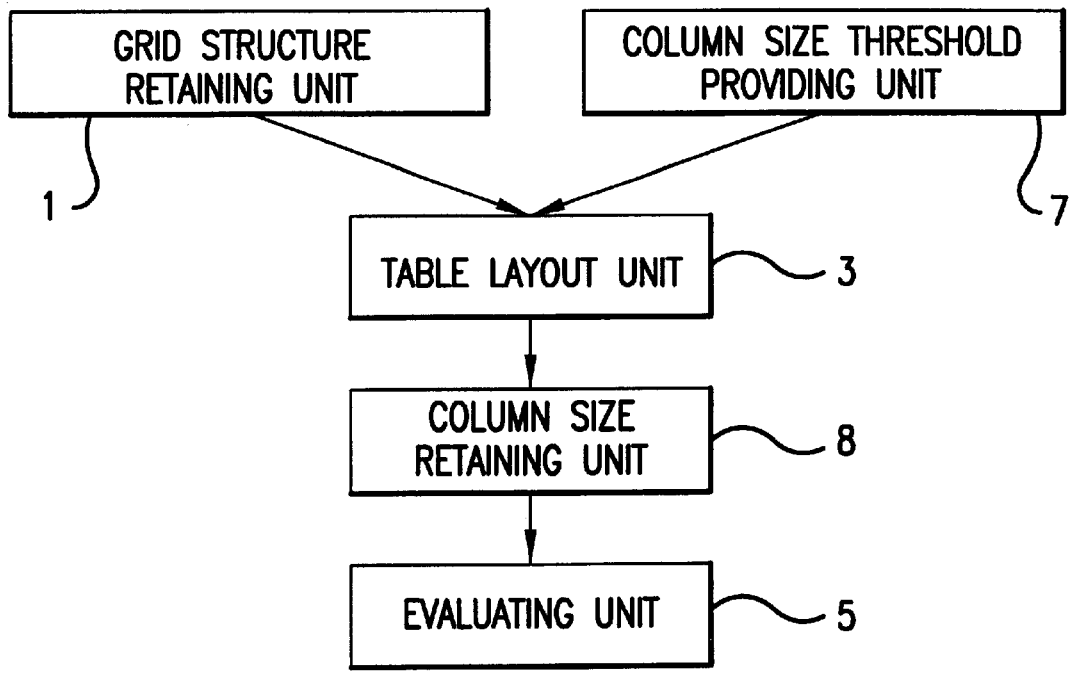
FIG. 22 is an overview illustrating fifth preferred embodiment of the tabulation device according to the present invention.
FIG. 23 is a schematic diagram of one example of the column size threshold value of retained in the column size threshold providing unit 7 in the fifth preferred embodiment of the tabulation device according to the present invention.
FIG. 24 is a schematic diagram of one exemplary column size retained in the column size retaining unit 8 in the fifth preferred embodiment of the tabulation device according to the present invention.

FIG. 22 is an overview illustrating fifth preferred embodiment of the tabulation device according to the present invention. In this figure, like numerals refer to same components for the purpose of simplify the description. Reference numeral 7 designates to a column size threshold providing unit, and reference numeral 8 to a column size retaining unit.

The column size threshold providing unit 7 for provides $$\bigcup_{i=1}^{m} Si$$

for each column where $S_i$ is a set of widths at a plurality of discontinuous points of a line breaking function for $T_i$, $T_1, \ldots, T_m$ are the text strings which are contained by the column, and the line breaking function of $T_i$ maps a width to a height of a rectangular area whose height is minimum for laying out $T_i$ in it.

FIG. 23 is a schematic diagram of one example of the threshold value of column size retained in the column size threshold providing unit 7 in the fifth preferred embodiment of the tabulation device according to the present invention. In FIG. 23, the column number is an index prepared to each column of the table. For example, when the grid structure retaining unit 1 retains the grid structure information as shown in FIG. 6B, the threshold value of the line-breaking function obtained from these text strings was the text field size threshold value shown in FIG. 8 as described above. Because a left most column which is denoted as a column 1 includes texts 1, 4, and 7, any possible values which may be taken as the widths of text field size threshold value for the text numbers 1, 4, and 7 are stored in the column size threshold providing unit 7 as column size threshold values for the column 1. This also applies to other columns.

The column size retaining unit 8 stores the correspondence of one value in the column size threshold providing unit 7 to one column for every columns. FIG. 24 is a schematic diagram of one exemplary column size retained in the column size retaining unit 8 in the fifth preferred embodiment of the tabulation device according to the present invention. As shown in FIG. 24, the column widths are retained as column size corresponding to column number.

The table layout unit 3 allows the combinations of the column numbers and its column size in the column size retaining unit 8 to be added or altered to perform table layout. The layout evaluation unit 5 evaluates the layout result of the table or a part thereof according to the column size retained in the column size retaining unit 8, thereby to allow the layout unit 3 to perform re-layout of the table if needed.

Figures 25, 26A, 26B, 26C:
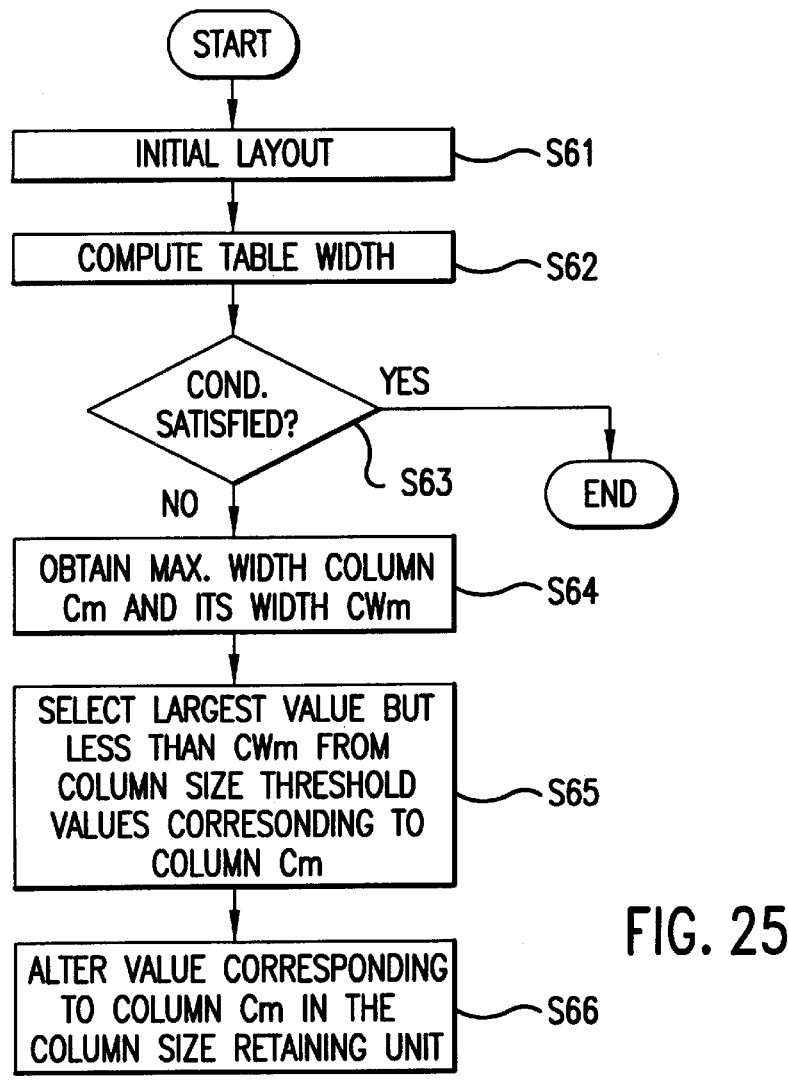
FIG. 25 is a flowchart illustrating one exemplary operation in the fifth preferred embodiment of the tabulation device according to the present invention.

FIG. 25 is a flowchart illustrating one exemplary operation in the fifth preferred embodiment of the tabulation device according to the present invention. In this example also, layout is assumed to be performed such that the table width is less than or equal to 15 characters.

In Step S61, the layout unit 3 performs initially default layout. In the default setting, the largest width in each column is selected from within the column sizes retained in the column size threshold providing unit 7 to store in the column size retaining unit 8 by combining the size and the column.

Next, the layout evaluation unit 5 evaluates the table layout result to evaluate whether the table width is less than or equal to 15 characters. The determination step is comprised of the step of computation of the table width in Step S62 and the step of determination whether or not the result computed in Step S62 satisfies a given condition. In Step S62, the table width is computed by summing all the column sizes stored in the column size retaining unit 8. In Step S63 it will be evaluated whether or not the table width computed in Step S62 is less than or equal to 15 characters and if so the table layout terminates. If not, the layout evaluation unit 5 directs the layout unit 3 to re-lay out.

In the re-layout process, in Step S64, the layout unit 3 compares widths of each column with each other to retrieve a column $C_m$ which has the largest width and its width $CW_m$. In Step S65, the largest value which is smaller than the width $CW_m$ from within the column size threshold values retained in the column size threshold providing unit 7, that is, when the table layout unit 3 selects a column size $S_i$ among sizes $S_1, \ldots, S_o$ which are provided by the column size size threshold providing unit 7 for $C_m$, the unit selects the $S_i$ which satisfies $$(S_i < CW_m) \wedge \forall j \in \{1, \ldots, o\}(S_j \leq S_i \vee CW_m \leq S_j).$$

In Step S66, the value corresponding to the column Cm in the column size retaining unit 8 is altered to the column size threshold value obtained in Step S65. Then the process returns to step S62.

One exemplary operation of the table layout process as described above will be described below by using a concrete example. FIG. 26 is a schematic diagram showing one variation of column size retained in column size retaining unit 8 during the practical process in one exemplary operation of the fifth preferred embodiment of the tabulation device according to the present invention. FIG. 27 is one example of table thus generated during the practical process.

In the default state, the grid structure retaining unit 1 and the column size threshold providing unit 7 retains grid structure information as shown in FIG. 6, and column size threshold value as shown in FIG. 23, respectively. Also, the column size retaining unit 8 retains nothing.

The layout unit 3 performs initially default layout. The column size retaining unit 8 retains the column sizes as shown in FIG. 24 corresponding to each column. As the table width is 24, re-layout will be performed. The column with the largest width is the column of number 3, which has 9 character width as column size. For this column, a column size threshold value which has width narrower than 9 and largest therein will be selected from the column size threshold providing unit 7 to alter the value in the column size retaining unit 8. In other words, for this column, table layout unit 3 selects a column size $S_i$ among sizes $S_1, \ldots, S_o$ which are provided by the column size threshold providing unit 7 for the column. In this case, the unit selects the $S_i$ which satisfies $$(S_i < 9) \wedge \forall j \in \{1, \ldots, o\}(S_j \leq S_i \vee 9 \leq S_j)$$

The contents of the column size retaining unit 8 will be thereafter as shown in FIG. 26A.

At this point the table width is 21, which does not satisfy the given condition, thus re-layout for the column number 1 will be performed. The contents of the column size retaining unit 8 will be as shown in FIG. 26B. The table width is not yet complying to the given condition. Another re-layout for the column number 2 will be performed and the contents of the column size retaining unit 8 will be as shown in FIG. 26C. At this point as the table width satisfies the given condition, the layout process terminates. The table width may be determined in this manner at first, and the heights of each row may be defined to lay out text strings. Thus generated table is shown in FIG. 27.

According to the fifth embodiment of the present invention, layout is performed by using column size threshold values which may be candidates of widths for each column. This process allows computing costs to be decreased by decreasing the combinations to be tried, in comparison with the case in which column widths are determined by first obtaining the text field size threshold values for each cell and second combining them.

Some preferred embodiments of the present invention has been described above. It shouldbe noted that, in the present invention, layout may be performed once discontinuous points of line-breaking function in the object to be laid out are determined. As described above in connection with the first preferred embodiment, the object to be laid out in a table may be, not only a text string having same character size and fixed pitch, but also such text as text string including alphanumerics and arranged in proportional layout, text string with carriage return, text string including different character sizes and pitches and non-uniform line-spacing, text string written up-to-down, drawings, graphs, charts, equations, and so on.

As have been described above, when the layout evaluation unit 5 computes the size of table, the thickness of ruled lines, the margins within a cell, and the text alignment may be taken account into consideration. The object to be evaluated by the layout evaluation unit 5 may also be, not only the table width, but also table height, table area, or variance of line height/line width. A variety of condition may be set, such as, for example, a plurality of objects to be subject of simultaneous evaluation.

Although the text field size threshold providing unit 2 in the first and fourth preferred embodiment and the column size threshold providing unit 7 in the fifth embodiment have been described to retain all of the text field size threshold values in advance, the text field size threshold values and column size threshold values may be provided as necessary, by computing during layout.

Although the text field size retaining unit 4 in the first and fourth preferred embodiment and the column size retaining unit 8 in the fifth embodiment have been described to actually retain the text field sizes or column sizes, the text field size retaining unit 4 or column size retaining unit 8 may hold indices corresponding to each text strings, by indexing individually respective text field size threshold values or column size threshold values provided by the text field size threshold providing unit 2 or the column size threshold providing unit 7.

It should be noted that the combination of the above described embodiments may also be implementable. For example, it is possible to introduce the column width upper limits shown in the third embodiment into the structure of the fourth or fifth preferred embodiment as described above.

It is also to be noted that, in one of embodiments described above, row and column or width and height may be replaced each with other. For example, the second embodiment as described above may also be arranged to lay out column by column. Similarly, the fifth embodiment as described above may be arranged to determine heights row by row by using row size threshold values. Although not described herein in details, it may be recognized by those skilled in the art that such structures of replacing row with column or width with height may be arranged readily.

The present invention may be combined with a conventional word processor to operate the device of the present invention each time text strings in a table is edited, to obtain a table suitable to the contained text at that time.

As is clear from the description as above, according to the present invention, because the candidates of text widths are limited to the discontinuous points of their line breaking functions, allowing table layout to be performed rapidly with less waste blank space, without defining directly the spacing between ruled lines which can be arranged in the infinite number of combination. Further, according to the present invention, the layout result of the entire table or part thereof are evaluated, and based on the evaluation result, table re-layout will be performed. By evaluating an laid out table with respect to various conditions such as its size and area of blank space, to re-lay out if for example "table size does not fit to the page width" or if "area of blank space is too large", more desirable table may be obtained.

When laying out by using row/column size upper limit for each row/column, in order to prevent a text height/width in one row/column from excessively differing from others to degrade the appearance of the table, by directing row/column size upper limit holding unit to hold row/column size limit. Moreover, holding row/column size upper limit derived from such parameters as page size, table layout without departing from the limitation may be achieved.

Also, by increasing as much line-breaking as possible, text height/width in one row/column can be aligned to obtain a good looking and compact table.

In addition, by selecting text field size with the width/height as small as possible, layout of a compact table may be obtained.

Furthermore, by selecting one of column/row size thresholds from a definite number of candidates for each column/row, table layout may be rapidly performed with less waste blank space.

What is claimed is:

1. A tabulation device comprising:
    a grid structure retaining means which maintains text strings composing a table and grid structure;
    text field size threshold providing means for providing at least a value of one of the width and the height at a plurality of discontinuous points output of a line-breaking function on said text strings composing a table, said line breaking function of a text maps a width/height to a height/width of a rectangular area whose height/width is minimum for laying out the text in said rectangular area;
    text field size retaining means for retaining a relationship between said text string composing said table and the size of a rectangular area provided by said text field size threshold providing means in response to said text;
    table layout means for acquiring one of said sizes of rectangular area from said text field size threshold providing means, for causing said text field size threshold retaining means to retain the relationship between said text and said one of the sizes of rectangular area acquired by said table lay out means, based on said grid structure; and evaluating means responsive to the result of comparison of the tabulation by said table lay out means with predetermined conditions for directing said table layout means to acquire another one of the sizes of rectangular area from said text field size threshold providing means, for causing said text field size threshold retaining means to retain the relationship between said another one of the sizes of rectangular area and said text.

2. A tabulation device according to claim 1, further comprising:

column/row width upper limit retaining means for retaining the upper limit value of the width of row or column composing said table, wherein said evaluating means directs said table layout means to lay out said text composing said table such that each of the row or column composing said table has the width less than said upper limit value.

3. A tabulation device according to claim 1, wherein:

said evaluating means controls said table lay out means such that in response to said comparison another one of the sizes of rectangular area is acquired from said text field size threshold providing means to the cell to which the maximum width or height of the size of text field is laid out among cells included in one row or one column of said table.

4. A tabulation device according to claim 1, wherein:

given by defining the heights/widths as $L_1, \ldots, L_m$, of the text field retained in said text field size retaining means in response to the text strings $T_1, \ldots, T_m$ in one given row/column in a table, for a given text string $T_i$ among the text strings $T_1, \ldots, T_m$, said table lay out means lays out the text string $T_i$ to the table so as not to present an L satisfying $L_i < L \leq \max (L_i, \ldots, L_m)$ provided by the text field size threshold providing means to the text string.

5. A tabulation device according to claim 1, wherein:

given by defining a group of text strings in a given row or column composing a table as $T_1, \ldots, T_m$, and a group of the sizes of rectangular area retained in the means for retaining the sizes of text field and corresponding to said group of text strings $L_1, \ldots, L_m$, said table lay out means lays out said group of text strings such that the size of rectangular area which is equal to the maximum value of the height or width of said group of the sizes of rectangular area or most approximate to the maximum value among the sizes of rectangular area supplied from the means for providing the size of text field in response to the text string $T_i$ becomes the size $L_i$ of rectangular area for said text string $T_i$.

6. A tabulating device according to claim 1, wherein:

given by defining the heights as $H_1, \ldots, H_m$ and the widths as $W_1, \ldots, W_m$ of the text field retained in said text field size retaining means corresponding to the text strings $T_1, \ldots, T_m$ in one given row in a table, for a given text Ti among said text strings $T_1, \ldots, T_m$ said table lay out means lays out the text string $T_i$ to the table so as not to present a size of a rectangular area whose width $W_j$ and height $H_j$ satisfies $W_j < W_i$, and $H_j \leq \max (H_1, \ldots, H_m)$ in said sizes of rectangular area provided by said text field size threshold providing means to the text string $T_i$.

7. A tabulation device according to claim 1, wherein:

given by defining the heights as $H_1, \ldots, H_m$ and the widths as $W_1, \ldots, W_m$ of the text field retained in said text field size retaining means corresponding to the text strings $T_1, \ldots, T_m$ in one given column in a table, for a given text $T_i$ among said text strings $T_1, \ldots, T_m$, said table lay out means lays out the text string $T_i$ to the table so as not to present a size of rectangular area of width $W_j$ and height $H_j$, satisfying $H_j < H_i$ and $W_j \leq \max (W_1, \ldots, W_m)$ in said sizes of rectangular area provided by said text field size threshold providing means to the text $T_i$.

8. A tabulation device according to claim 1, wherein:

if another size of rectangular area is provided by said text field size threshold providing means in response to one of said text and said another size is less than the present width/height of said text field size and not more than the maximum height/width of text field sizes of texts which belongs to a column/row including said text, said evaluating means directing said table lay out means to acquire said another size of rectangular area from said text field size threshold providing means, for causing said text field size threshold retaining means to retain the relationship between said text and said another size of rectangular area.

9. A tabulation device according to claim 1, wherein:

said table lay out means re-lays out by selecting a size of rectangular area of the cell from within a plurality of sizes of rectangular area provided by said means for providing the size of text field, such that the height/width of the cell decreases when said table is re-laid out such as to increase the width/height of the cell composing the table.

10. A tabulation device comprising:

a grid structure retaining means which maintains text strings composing a table and grid structures;

column/row size threshold providing means for providing at least part of elements of $$\bigcup_{i=1}^{m} Si$$

for each column/row, wherein said $S_i$ is a set of widths/heights at a plurality of discontinuous points of a line breaking function for $T_i$, wherein $T_1, \ldots, T_m$ are the text strings which are contained by the column/row;

said line breaking function of a text maps a width/height to a height/width of a rectangular area whose height/width is minimum for laying out the text in said rectangular area;

column/row size retaining means for retaining a relationship between the each of columns/rows composing the table and one of elements provided by said column/row size threshold providing means in response to the column/row;

table lay out means for acquiring one of said elements of rectangular area from said column/row size threshold providing means, for causing said column/row size retaining means to retain the relationship between said text and said one of the elements of rectangular area acquired by said table lay out means, based on said grid structure; and evaluating means, responsive to the result of comparison of the tabulation by said table lay out means with predetermined conditions, for directing said table lay out means to acquire another one of elements from said column/row size threshold providing means, for causing said column/row size retaining means to retain the relationship between said text and said another one of the elements of rectangular area acquired by said table lay out means.

11. A tabulation device according to claim 10, further comprising:

column/row upper limit retaining means for retaining the upper limit of the size of row or column for at least each of the row and column composing said table, said evaluating means allowing said table layout means to lay out said row or column composing said table such that each of the row or column composing said table has the width less than said upper limit value.

12. A tabulation device according to claim 10, wherein:

said evaluating means controls said table lay out means such that another one of elements is acquired from said column/row size threshold providing means for the column/row who has the maximum width/height among columns/rows in response to said comparison.

* * * * *